Figure 1:
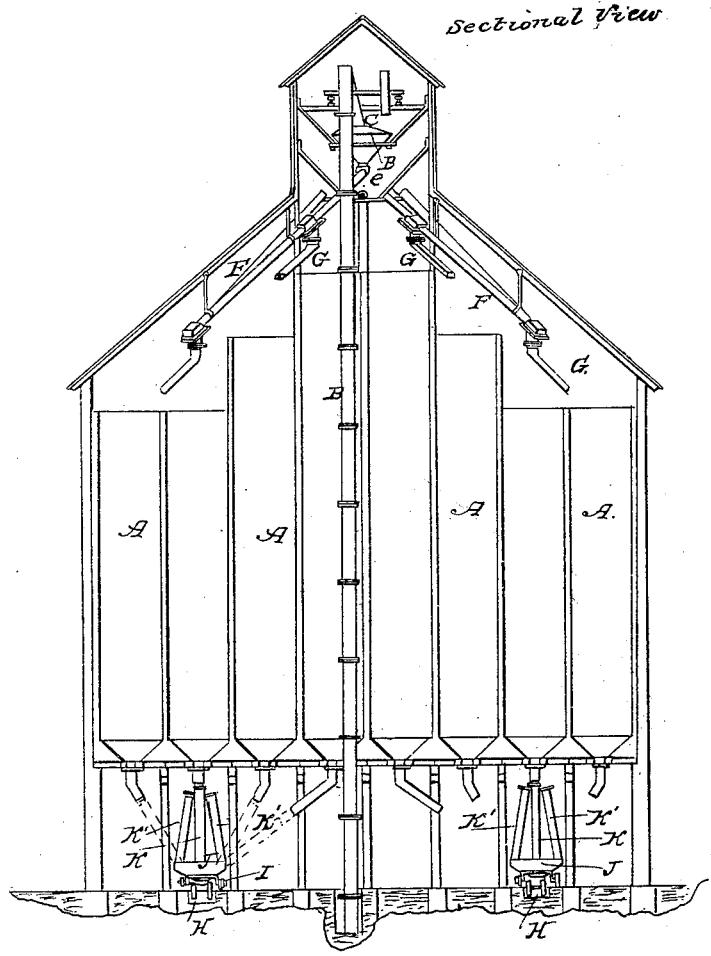
Figure 2:
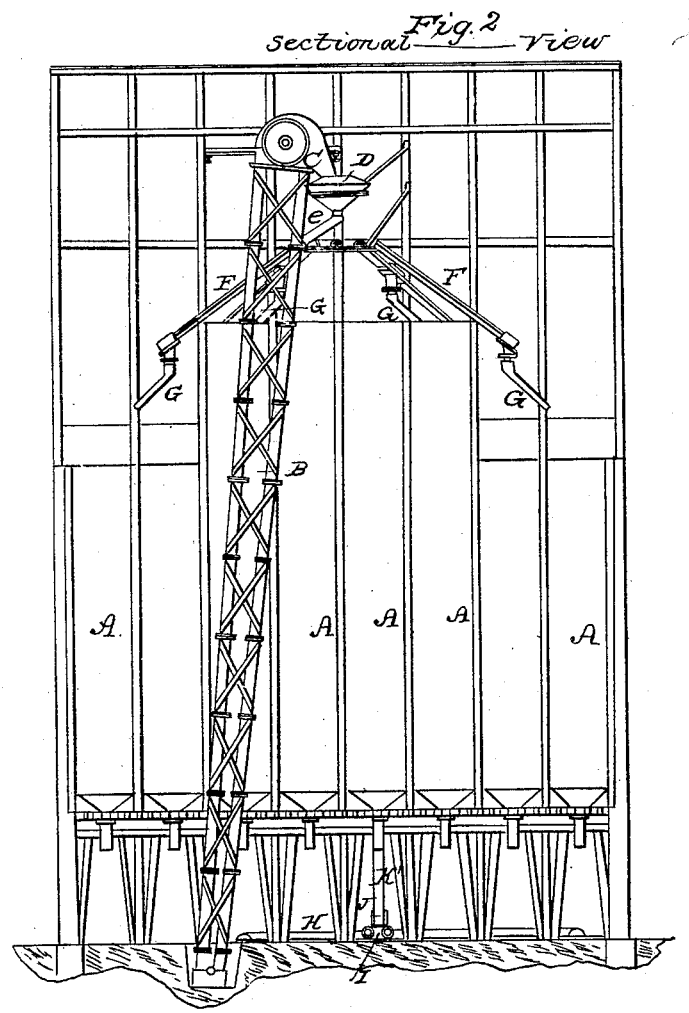
Figure 3:
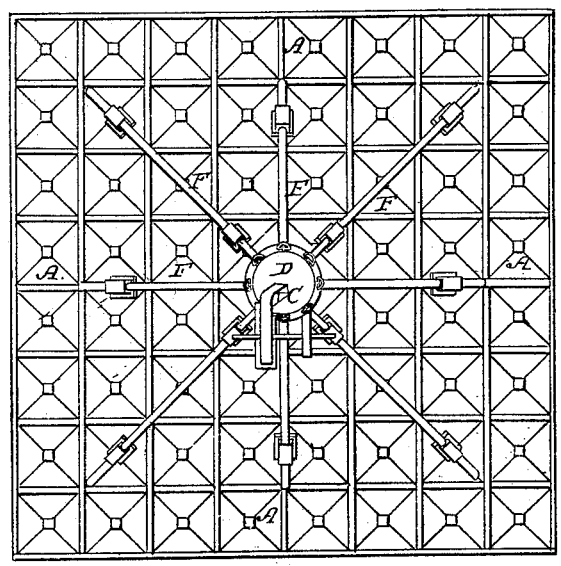

G. H. JOHNSON.
Grain Distributer.

No. 86,410.

3 Sheets—Sheet 3.

Patented Feb. 2, 1869.

UNITED STATES PATENT OFFICE.

GEORGE H. JOHNSON, OF BUFFALO, NEW YORK, ASSIGNOR TO HIMSELF, GEORGE W. TIFFT, SONS & CO., OF SAME PLACE.

IMPROVEMENT IN GRAIN-DISTRIBUTERS.

Specification forming part of Letters Patent No. 86,410, dated February 2, 1869.

*To all whom it may concern:*

Be it known that I, GEORGE H. JOHNSON, of the city of Buffalo, in the county of Erie and State of New York, have invented certain new and useful Improvements in Grain-Elevators; and I do hereby declare that the following is a full and exact description thereof, reference being had to the accompanying drawings, making part of this specification.

My improvements relate, first, to the system of spouts by which the grain is distributed to the storage-bins; second to the arrangement of the storage-bins; third, to the means for discharging the grain from the bins upon the conveyer beneath.

The invention consists, first, in the arrangement of a hopper and short swinging spout centrally with reference to the grain-bins, and a system of radiating and distributing spouts, in such a manner that the swinging spout may be made to connect indifferently with either of the distributing-spouts, and thus enable the grain from the hopper to be distributed through any one of the radiating spouts, as may be required; second, in combining with a system of radiating spouts a series of swinging spouts, arranged along the same, for distributing the grain into the intermediate bins; third, in constructing and arranging the storage-bins so that the heights of the different ones will increase toward the center and conform to the inclination of the distributing-spouts, whereby an increased amount of storage-room is obtained, the grain distributed with a less expense in the length of spouts, while the increased elevation of the interior bins enables the roof of the building to be supported with less frame-work than is otherwise required; fourth, in the arrangement, with a belt-conveyer beneath the grain-bins, of a truck or carriage provided with a hopper, whereby the truck, which travels astride of the conveyer, may be arranged under either of the bins overhead, and receive and properly conduct the grain therefrom onto the conveyer; fifth, in combining with said truck and hopper one or more hinged spouts, which may be made to connect with the discharge-spouts of the adjacent rows of bins, and conduct the grain therefrom to the hopper.

In the accompanying drawings, Figure I is a central vertical section of an elevator, showing a rear elevation of the elevator-leg. Fig. II is a similar section, made at right angles to the former. Fig. III is a plan of the elevator with the roof removed.

Like letters refer to like parts in each of the figures.

A A represent the grain-bins; B, the elevator-leg, and C the discharge-spout at its head. D is a hopper, which receives the grain from the spout C, either directly, as shown, or indirectly from a conveyer when the elevating-leg is arranged at one side of the building. This hopper is arranged centrally over the bins, and is provided with a swinging spout, $e$, attached to its discharge.

F F is a series of radiating spouts for distributing the grain to the different portions of the elevator. The spout $e$ is so hinged to the hopper that it can be swung around and be made to connect indifferently with any one of the distributing-pipes F, whereby it serves as a conduit from the hopper to each of them.

G G is a series of secondary distributing-spouts attached at intervals to the under side of the main spouts F in such a manner as to permit them to swing to either side. At the junction of these spouts the main spouts are provided with a flap-valve, which will operate to close either the main passage or the mouth of the auxiliary spout.

By this arrangement the grain from the radiating spout can be discharged at any point into one of these swinging branches, through which it may be distributed into the different bins at each side, within reach of the swinging end of the spout.

The bins A A are arranged in grades of different heights, which increase toward the center of the building, the heights of the bins conforming more or less to the inclination of the distributing-spouts.

Hitherto, in the construction of elevators, the storage-bins have all been of the same altitude.

The distributing-spouts being of necessity more or less inclined to insure the transmission of the grain, considerable space was left over the central bins, which was unoccupied except by the spouts which conducted the grain therein. By means of my improved arrangement this space is utilized, which materially adds to the capacity of the central bins, while, from the closer proximity of the tops of the bins to the distributing-spouts, a less length of the branch spouts suffices.

Another advantage of this feature results from the fact that the increased elevation of the bins brings them so near the roof as to enable the latter to be supported therefrom with less frame-work and more securely than it otherwise could.

The object of the remaining features of the invention is to facilitate the discharge of the grain from the bins onto the endless belt or canvas conveyers H beneath. These conveyers are constructed in the ordinary manner. On each side of these conveyers I provide any suitable way or track, on which run the wheels of a truck or carriage, I, the body of which is sufficiently elevated to clear the belt H, which it surmounts. This carriage is constructed with a hopper, J, the discharge-passage from which is directly over and in such proximity to the belt-conveyer as to insure the proper discharge of the grain thereon.

K represents a stationary spout attached to the hopper, and is designed to connect to the discharge-spouts of the row of bins over the conveyer.

K' K' are two corresponding spouts, hinged at their lower ends to the hopper, and designed to connect with the spouts of the adjacent row or rows of bins on each side of the conveyer, as shown in dotted lines, Fig. 1. When these latter spouts are not in use they may be inclined against the stationary spout, as shown, which enables the truck to pass the posts in traveling from one bin to another.

The operation of the truck is as follows: It is arranged along the conveyer under or opposite the bin from which the grain is required to be withdrawn, when the spout K or one of the spouts K' is connected with the discharge-spout of the bin, by which the grain is conducted to the hopper and by it properly discharged onto the conveyer. The employment of the truck and attachments not only effects a saving in the amount of spouts required, but also enables the connection with the different bins to be made with increased facility.

What I claim as my invention, and desire to secure by Letters Patent, is—

1. The hopper D and swinging spout e, arranged and operating with a system of radiating and distributing spouts F F, substantially as set forth.

2. The arrangement of a series of swinging branch distributing-spouts G G with a system of radiating spouts F F, substantially as set forth.

3. The construction and arrangement of the storage-bins so that the heights of the different ones will increase toward the center of the building, substantially as set forth.

4. The construction and arrangement of the truck I and hopper J with an endless conveyer H, for receiving the grain from the bins and discharging it on the latter, substantially as set forth.

5. The hinged side spout or spouts K', combined and arranged with the hopper J and carriage I, for connecting with the bins adjacent to the conveyer, substantially as set forth.

GEO. H. JOHNSON.

Witnesses:
W. H. FORBUSH,
JAY HYATT.